Jan. 24, 1928.
O. N. DAHL
1,657,152
FRUIT PICKING BUCKET
Filed April 7, 1925
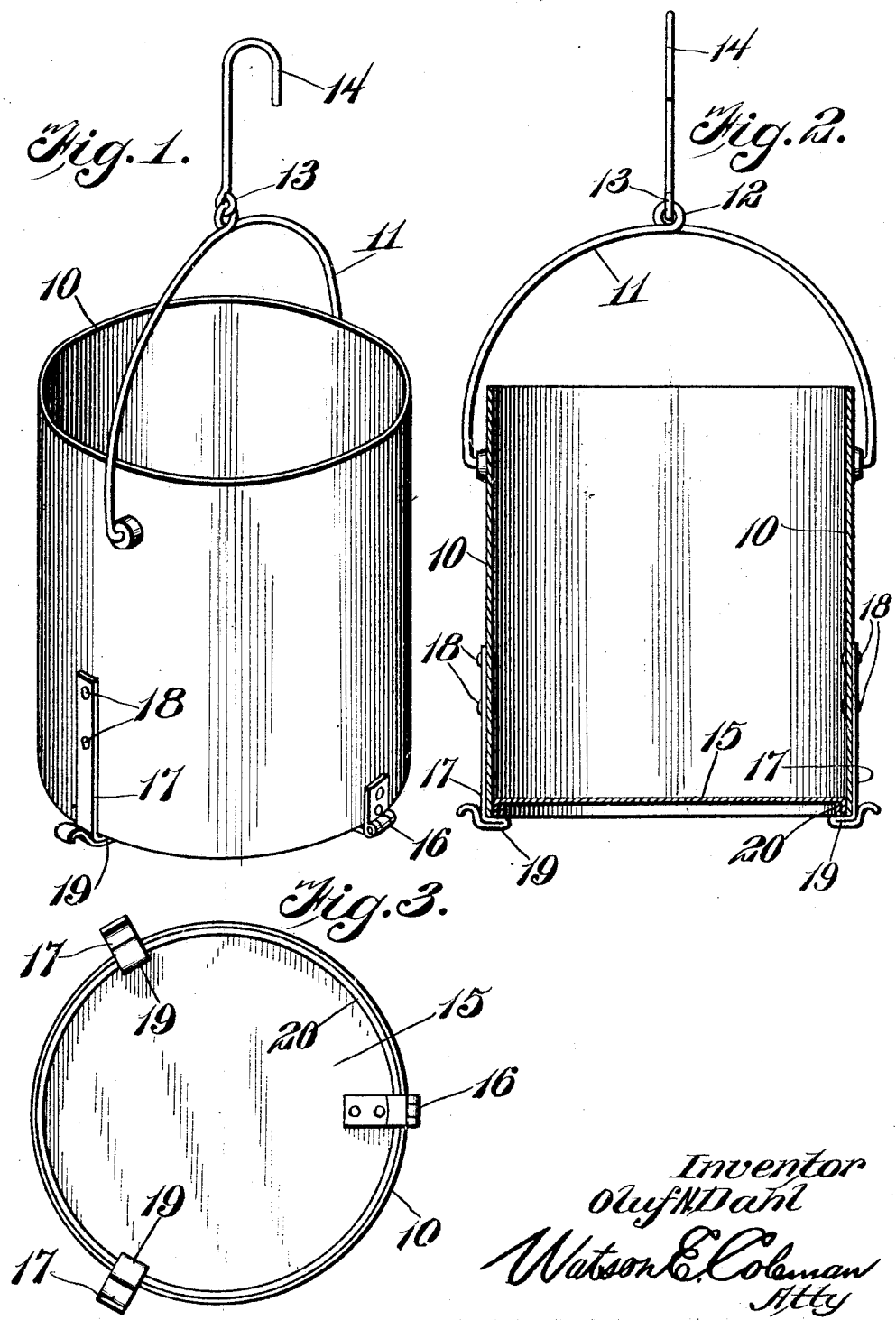

Patented Jan. 24, 1928.

1,657,152

UNITED STATES PATENT OFFICE.

OLUF N. DAHL, OF EXETER, CALIFORNIA.

FRUIT-PICKING BUCKET.

Application filed April 7, 1925. Serial No. 21,365.

This invention relates to fruit picking buckets and has for an important object thereof the provision of a device of this character which may be very cheaply produced and readily handled and from which the contents may be very readily removed.

A further object of the invention is to provide a device of this character from which the contents are removed at the bottom so that the fall of the fruit, when released, from the bucket, will not be such as will cause bruising thereof.

A further object of the invention is to produce a device of this character which may be conveniently used in the picking of plums, apricots and the like where the bucket will be rapidly filled and must be so constructed that it may be readily supported from a ladder upon which the picker is operating or from the limb of a tree adjacent the picker, it being understood that in the gathering of such fruits, it is necessary that the picker ascend a relatively tall ladder and reach amongst the limbs of the tree for the fruit.

These and other objects I attain by the construction shown in the accompanying drawings, wherein for the purpose of illustration is shown a preferred embodiment of my invention and wherein:—

Figure 1 is a perspective view of a fruit picking bucket constructed in accordance with my invention;

Figure 2 is a vertical sectional view therethrough; and

Figure 3 is a bottom plan view thereof.

Referring now more particularly to the drawings, the bucket consists of cylindrical side walls 10 of even diameter from top to bottom having pivoted thereto a bale 11. This bale is provided centrally with an eye 12 in which is engaged the eye 13 of an open hook 14 of such character that it may be readily engaged over the limb of a tree.

The bottom of the bucket, indicated at 15, is hinged to the bucket at one side thereof, as indicated at 16, and is provided at spaced points with a pair of catches 17 comprising spring strips riveted at their upper ends, as at 18, to the side walls of the bucket in circumferentially spaced relation to one another and to the hinge, such strips having at their lower ends hooked portions 19 engaging beneath the bottom of the bucket and around a bead 20 formed on the bottom.

In the use of the bucket, the bottom is first secured in position, the bucket is hung by the hook 14 from a convenient limb or rung of the ladder. When filled, it is transported to the dumping boxes and the contents thereof removed by releasing the hooks 19 so as to permit the bottom to swing about its hinge and the fruit within the bucket is passed through the opening thus formed. By providing the device with parallel side walls, crushing of the fruit in the bottom of the bucket against the side walls is prevented and by employing a plurality of the spring catches 17, accidental dumping of the contents of the bucket is avoided. Since it is necessary that the operator employ both hands for releasing the catches 17, the bucket is naturally placed in the receptacle in which the fruit is to be deposited before these catches are released so that there will be but very slight fall for the fruit and the chances of the same becoming bruised are materially reduced.

It will be obvious that the construction hereinbefore illustrated is capable of a certain range of change and modification without materially departing from the spirit of my invention and I accordingly do not limit myself to such specific structure except as hereinafter claimed.

I claim:—

A bucket comprising a body, a bottom member having a down-turned peripheral flange hinged to the body, a latch member of resilient material attached to the exterior surface of the body and extended across the lower edge thereof and adapted to engage under the peripheral flange of the bottom, said extended portion being folded upon itself and carried beyond the outer surface of the body and forming a handle extremity.

In testimony whereof I hereunto affix my signature.

OLUF N. DAHL.